(12) United States Patent
Stasior et al.

(10) Patent No.: US 9,645,722 B1
(45) Date of Patent: May 9, 2017

(54) PREVIEW SEARCH RESULTS

(75) Inventors: William F. Stasior, Los Altos, CA (US); Matthew W. Amacker, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 1188 days.

(21) Appl. No.: 12/950,862

(22) Filed: Nov. 19, 2010

(51) Int. Cl.
G06F 3/048 (2013.01)
G06F 3/0485 (2013.01)
G06F 17/30 (2006.01)

(52) U.S. Cl.
CPC ...... G06F 3/0485 (2013.01); G06F 17/30864 (2013.01)

(58) Field of Classification Search
CPC ......... G06F 17/30864; G06F 17/30696; G06F 17/30938; G06F 17/30991; G06F 17/30554; G06F 17/3084; G06F 17/30929; G06F 17/30941; G06F 17/30967; G06F 2212/6082; G06F 2212/6032; G06F 2212/6028; Y10S 707/99933
USPC ........................................................ 715/784
See application file for complete search history.

(56) References Cited

U.S. PATENT DOCUMENTS

| | | | | |
|---|---|---|---|---|
| 6,683,633 | B2 * | 1/2004 | Holtzblatt et al. | 715/854 |
| 7,020,338 | B1 * | 3/2006 | Cumbee | 382/230 |
| 7,533,242 | B1 * | 5/2009 | Moll et al. | 711/213 |
| 7,580,960 | B2 * | 8/2009 | Travieso et al. | |
| 7,747,749 | B1 * | 6/2010 | Erikson et al. | 709/226 |
| 7,801,885 | B1 * | 9/2010 | Verma | 707/713 |
| 7,810,042 | B2 * | 10/2010 | Keely et al. | 715/776 |
| 7,814,425 | B1 * | 10/2010 | O'Shaugnessy et al. | 715/752 |
| 8,370,342 | B1 * | 2/2013 | Li et al. | 707/728 |
| 2004/0204128 | A1 * | 10/2004 | Zakharia et al. | 455/566 |
| 2004/0205514 | A1 * | 10/2004 | Sommerer et al. | 715/501.1 |
| 2005/0149576 | A1 * | 7/2005 | Marmaros et al. | 707/200 |
| 2006/0069670 | A1 * | 3/2006 | Khaliq et al. | 707/3 |
| 2006/0095424 | A1 * | 5/2006 | Petropoulos et al. | 707/3 |
| 2006/0101341 | A1 * | 5/2006 | Kelly | G06F 17/30899 715/738 |
| 2006/0288124 | A1 * | 12/2006 | Kraft et al. | 709/246 |
| 2006/0294476 | A1 * | 12/2006 | Buckley | 715/781 |
| 2007/0050251 | A1 * | 3/2007 | Jain et al. | 705/14 |
| 2007/0050252 | A1 * | 3/2007 | Jain | 705/14 |
| 2007/0073833 | A1 * | 3/2007 | Roy et al. | 709/217 |

(Continued)

OTHER PUBLICATIONS

Paek, et al., "WaveLens: A New View onto Internet Search Results", In Proceedings of the SIGCHI Conference on Human Factors in Computing Systems, Apr. 24-29, 2004, 8 pages.*

Primary Examiner — Maryam Ipakchi
(74) Attorney, Agent, or Firm — Hogan Lovells US LLP

(57) ABSTRACT

Systems and methods are provided for previewing content that is located behind the links of a search results webpage without having to click on the links and thereby cause webpage changes. Embodiments provide a webpage that presents a first set of search results in response to a search query submitted by a user. This webpage is displayed in a graphical user interface and the first set of search results comprises one or more links to other search results webpages, which are defined dynamically and cannot be pre-computed. In the event a user mouses over one of the links, embodiments execute the search associated with the moused-over link and then render selected portions of the search results in a preview window that is positioned over a portion the webpage that displays the first set of search results.

24 Claims, 6 Drawing Sheets

(56) References Cited

U.S. PATENT DOCUMENTS

| | | | |
|---|---|---|---|
| 2007/0255702 A1* | 11/2007 | Orme | 707/5 |
| 2008/0022229 A1* | 1/2008 | Bhumkar et al. | 715/838 |
| 2008/0027928 A1* | 1/2008 | Larson | 707/5 |
| 2008/0195674 A1* | 8/2008 | Kim et al. | 707/203 |
| 2008/0235594 A1* | 9/2008 | Bhumkar et al. | 715/738 |
| 2009/0150784 A1* | 6/2009 | Denney et al. | 715/722 |
| 2009/0217168 A1* | 8/2009 | Dexter et al. | 715/731 |
| 2009/0234811 A1* | 9/2009 | Jamil et al. | 707/3 |
| 2009/0313100 A1* | 12/2009 | Ingleshwar | 705/14.25 |
| 2010/0070484 A1* | 3/2010 | Kraft et al. | 707/706 |
| 2010/0146012 A1* | 6/2010 | Beaudreau et al. | 707/803 |
| 2012/0084644 A1* | 4/2012 | Robert et al. | 715/255 |

* cited by examiner

PREVIEW SEARCH RESULTS

BACKGROUND

There are currently a wide variety of search engines and tools that permit computer users to search for electronic information. For example, a typical search engine, in response to receiving a search query from a user, executes a search and then displays search results in a graphical user interface. Some search engines provide search refinement suggestions along side of the search results. These refinements are often limited to specific categories or other types of information, which can be of limited assistance in searching for information, as there can be many levels of subcategories, and the user might not know the correct path to get to the desired information. Oftentimes, to find the desired information in an Internet-based environment, the user might start with a search query, but still ends up browsing from webpage to webpage by clicking on links to the search results and search refinement suggestions. Browsing from webpage to webpage may be inefficient, however, as each time the user clicks on a link such as a refinement, for example, the user has to wait for the next webpage to load. If the refinement causes another search to be executed, the webpage also must wait on the query to be executed to present the results. Once that webpage loads, there is a reasonable chance the user will return to the previous webpage because the results did not contain the desire information. In addition to being inefficient, browsing from webpage to webpage may cause the user to lose context of the original search. In this event, the user may have to restart the search from the original query or a whole new query.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of numbers is for purposes of simplicity of explanation and understanding, and should not be viewed as a limitation on the various embodiments.

DETAILED DESCRIPTION

Figure 1:
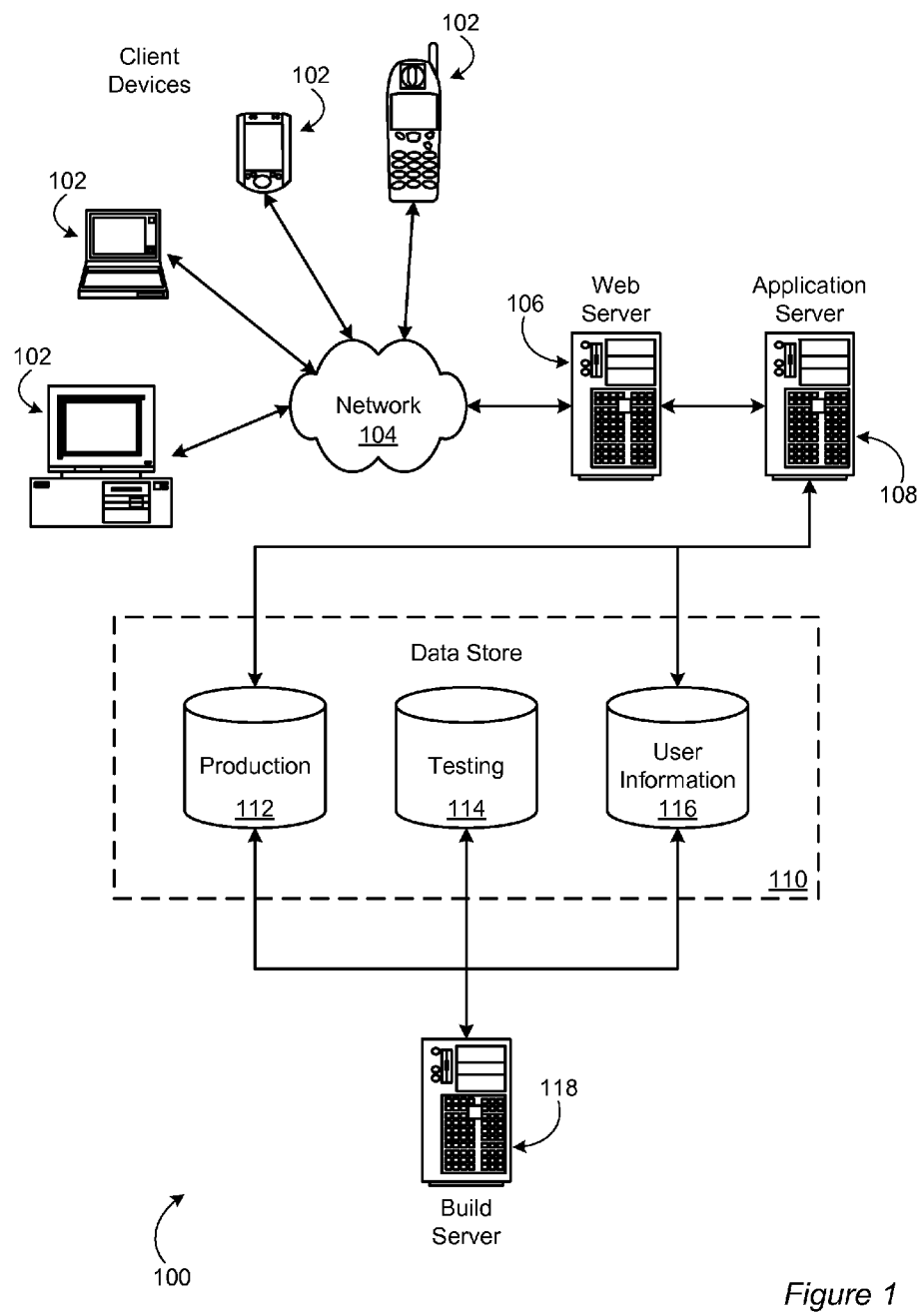
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiment being described.

Disclosed herein are example techniques, including systems and methods, for previewing information about content that is associated with a user-selectable element on a webpage of content. In one instance, upon a user hovering a pointer (e.g., mouse pointer) over a link, a preview is provided in a preview window showing at least some of the content located on the webpage that would be displayed upon selection of the link. Thus, the user can preview content available on another webpage without having to actually click on the link and navigate to the other webpage to view the content. Among other things, this is a time-saving feature available to the user. For example, if the user determines that the items displayed in the preview while hovering a mouse pointer over a link are not of interest, the user will not select the link and browse other sections of the website. The user is not required to select the link, view a second webpage to determine that the items are not of interest and then, for example, select a "back" button to return to the first webpage. The user can make the determination that the second webpage is not of interest without ever leaving the first webpage. The ability to view content on a second webpage without having to leave a first webpage reduces search time and optimizes webpage navigation.

In operation, embodiments provide a webpage or other grouping or display of content (e.g., a webpage) that presents a first set of search results in response to a search query submitted by a user. This webpage is displayed in a graphical user interface and the first set of search results comprises one or more search refinement links. In the event a user mouses over one of the search refinement links, embodiments execute the search associated with the moused-over link. For example, if the user mouses over, but does not click on, a search refinement link, that search refinement is executed in the background. While the search associated with the moused-over link is executed in the background, the webpage that presents the first set of search results remains on display in the graphical user interface. After the search associated with the moused-over link is executed, embodiments render selected portions of the search results in a preview window that is positioned over a portion the webpage that displays the first set of search results. According to some embodiments, the preview window is a tooltip and the selected portions of the search results that are rendered in the tooltip are images of items that are located on the webpage associated with the moused over link.

According to some embodiments, once the preview window is provided, the user can mouse over the individual items displayed in the preview window to obtain additional information about the respective items, or the user can click on one of the individual items to load a webpage that presents information about that item. This webpage may replace the webpage that presents the first set of search results.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 shown includes both a build portion (or side) and a production portion. The production portion may include one or more electronic client devices such as the client devices 102 depicted in FIG. 1. The client devices 102 may include any appropriate device operable to send and receive requests, messages, or information over an appropriate network 104 and convey information back to a user of the client devices 102. Examples of such client devices include personal computers, cell phones, handheld messaging devices, laptop computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment. The application server 108 may include any appropriate hardware and software for integrating with the data store as needed to execute aspects of one or more applications for the client devices 102, and may even handle a majority of the data access and business logic for an application.

The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example. The handling of all requests and responses, as well as the delivery of content between the client devices 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a build side designed to service the data store 110 rather than to service requests from the client devices 102. The build side of the environment 100 may include a development server 118, which can have functionality similar to the application server 108. In at least one embodiment, the application server 108 may also function as a build server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for webpage image information and access right information, which may be stored in any of the above listed mechanisms as appropriate or in additional mechanisms in the data store 110.

The data store 110 is operable, through logic associated therewith, to receive instructions from the application server 108 or build server 118, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web webpage that the user is able to view via a browser on one of the client devices 102. Information for a particular item of interest may be viewed in a dedicated webpage or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
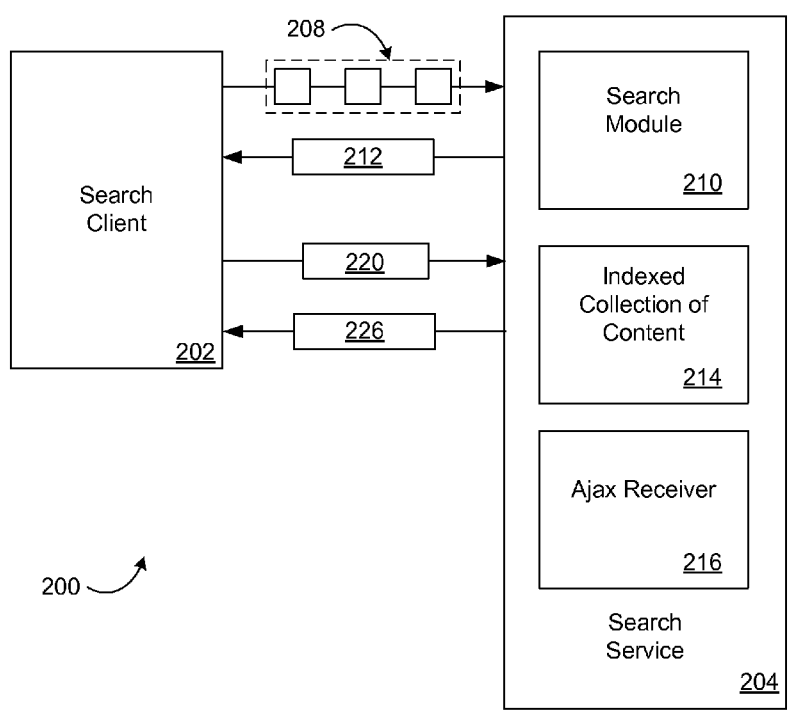
FIG. 2 is a schematic diagram depicting aspects of an example computerized system in accordance with at least one embodiment.

FIG. 2 depicts aspects of an example computerized system 200 configured to preview content located behind user-selectable elements, such as links, of a search results webpage, in accordance with at least one embodiment. The example system 200 includes a search client 202 and a search service 204. Although, for clarity, FIG. 2 depicts one each of the search client 202 and the search service 204, systems in accordance with at least one embodiment may include any suitable number of search clients and any suitable number of search services. The search client 202 and the search service 204 may be communicatively coupled, for example, by a communication network within a computer and/or between a plurality of computers such as the client devices 102 and the servers 106, 108, 118 of FIG. 1. For example, the search client 202 may be hosted and/or implemented at least in part by one of the client devices 102, and the search service 204 may be hosted and/or implemented at least in part by computer systems corresponding to the web server 106, the application server 108, the build server 118 and/or the data store 110.

The search client 202 may generate a search input stream 208 of search input elements such as characters of text. The unlabeled squares inside the dashed line 208 represent search input elements in FIG. 2. When the search input elements are characters of text, the search input stream 208 may be called a search input keystream (e.g., with reference to a keyboard method of input). However, search input elements are not limited to characters of text. For example, search input elements may include static images, audio, video, clickstreams, and any digitized data suitable for use as search input. The search client 202 may communicate the search input stream 208 to a search module 210 of the search service 204. The search module 210 may use the sequences of the search input elements in search input stream 208 to search across an indexed collection of content 214 and obtain search results 212. The search module 210 may communicate the search results 212 to the search client 202. For example, the search module 210 may generate a search results webpage that provides links to individual search results, links to related searches, or links to search refinements, such as item categories.

It should be appreciated that the indexed collection of content 214 may include any suitable content. Examples of suitable content include electronic records, data structures, data objects, representations including representations of goods such as physical goods and commercial goods and representations of services such as commercial services, documents, document collections, images including digital images in any suitable image format, audio, video, virtual environments including virtual realities (VR) and recordings thereof, and suitable combinations thereof. This content may be organized in any number of indexes, such as book indexes, electronics indexes, apparel indexes, etc.

According to an embodiment, if the user clicks on a link to a related search or a search refinement, a webpage change occurs. However, before committing to the webpage change caused by clicking on the link, the user can use the system 200 to preview what is "behind" the link. For example, the user can cause the search client 202 to send a preview request 220 to the search service 204. According to an embodiment, the user causes the search client 202 to generate and send the preview request 220 by mousing over or near the link. In response to the preview request 220, the search service 204 executes the refinement or related search associated with the link, and then sends preview search results 226 to the search client 202 for presentation in a preview window. According to an embodiment, an Ajax receiver 216 of the search service 204 receives the preview request 220 and invokes the search module 210 to execute the refinement or related search to obtain the preview search results 226.

According to an embodiment, if the user selects any of the items displayed in the preview window, then a new webpage associated with the selected item is provided. On the other hand, if the user moves the pointer off of the preview window and/or link without selecting either, the preview window simply disappears. Thus, the user can effectively view items normally only available for viewing on another webpage without having to leave the current webpage.

Figure 3:
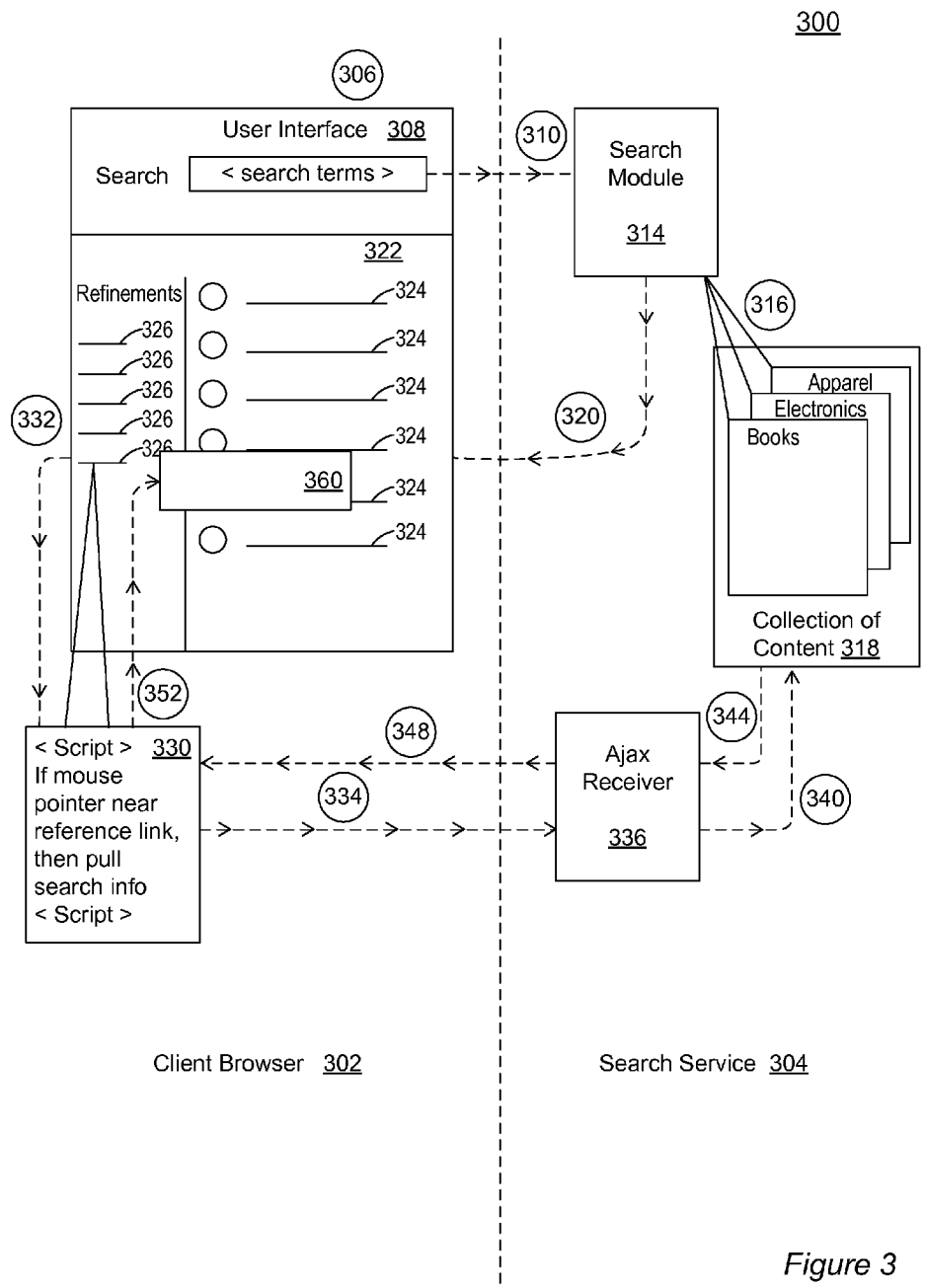
FIG. 3 is a data flow diagram illustrating a method of using an example computerized system to preview content located "behind" user-selectable elements of a search results webpage in accordance with at least one embodiment.

FIG. 3 is a data flow diagram illustrating an example method of using an example computerized system 300 to preview content located behind user-selectable elements, such as links, of a search results webpage, in accordance with at least one embodiment. The encircled reference numerals are referred to when describing the example method of using the system 300. However, it should be appreciated that the encircled reference numerals are provided for illustrative convenience and are not intended to limit ways in which data may flow in the system 300 or ways in which the system 300 may operate. For example, data may flow to and from any component of the system 300 in any order. The example system 300 includes a client browser 302 and a search service 304. The client browser 302 shown in FIG. 3 is an example of the search client 202 shown in FIG. 2, and the search service 304 shown in FIG. 3 is an example of the search service 204 shown FIG. 2.

As represented at 306, a user inputs search terms into a user interface 308, which is provided by the client browser 302, and, as represented at 310, the user interface 308 sends the search terms to a search module 314 of the search service 304. The search module 314 shown in FIG. 3 is an example of the search module 210 shown in FIG. 2. At 316, the search module 314 runs the search terms through an indexed collection of content 318 to identify items that may be relevant to the search terms (e.g., find a "first set of search results"). According to an embodiment, the indexed collection of content 318 may be stored in the data store 110 shown in FIG. 1. The first set of search results includes, for example, ASINs and associated HTML for the items that were identified in the indexed collection of content 318 as being relevant to the search terms. Further, for example, the first set of search results includes search refinements and associated links. Example search refinements include links to categories of items that are relevant to the submitted search terms and/or links to related searches that may be of interest to the user. The search module 314 may utilize any suitable relevance determination technique to determine which content in the indexed content collection 318 is relevant to the inputted search terms. Alternatively, or in addition, the inputted search terms may be associated with pre-defined subsets of the indexed content collection 318, and the search module 314 may include the pre-defined subsets in the first set of search results.

As represented at 320, the search module 314 sends the first set of search results to the user interface 308, which presents the search results in a search results presentation 322 that comprises links 324 to the individual items of the first set of search results and links 326 to the search refinements. According to an embodiment, the search refinement links 326 describe a search that is separate and independent from the search created by the search terms inputted by the user at 306. Further, according to an embodiment, the search refinement links 326 are encoded with information necessary to execute the separate search. For example, the search refinement links 326 are encoded with the search refinement and the one or more nodes of the indexed collection of content 318 to be searched.

As mentioned above, when a user reviews the first set of search results presented on the search results presentation 322, the user may want to preview the content behind one or more of the search refinement links 326 without having to click on one of the links and navigate to another webpage.

By previewing what is behind links without having to click on links and wait for webpage changes, the user is able to review more content in less time. To enable the user to preview content behind one or more of the search refinement links 326, when a user positions the mouse pointer over or near one of the links, a script 330 running on the presentation 322 causes the corresponding refinement search to be executed and then renders the refinement search results in the preview window.

For example, the script 330 may be running within the HTML on the client browser 302 and configured to "watch" where the mouse pointer goes on the search results presentation 322. According to an embodiment, if the mouse pointer gets within a predefined distance of one of the search refinement links 326, then as represented at 332 the client script 330 reads the refinement and pulls out the search refinement. For example, the script 330 may execute an if-then statement that says "if mouse pointer gets near or touches one of search refinement links 326, then read that search refinement link."

As represented at 334, the script 330 causes the client browser 302 to send data that represents the refinement search to an Ajax receiver 336 of the search service 304. As represented at 340, the Ajax receiver 336 decodes the data that represents the search refinement to determine which type of search needs to be executed and runs the search across the appropriate index or indexes of the indexed collection of content 318. According to an embodiment, the Ajax receiver 336 or some other component of the system 300 invokes the search module 314 to execute the search. For example, if the search refinement link 326 is directed to books, the Ajax receiver 336 figures out that the refinement search is for books and runs that search refinement across the index of the indexed collection of content 318 that contains content related to books. As represented at 344, the Ajax receiver 336 obtains from the indexed collection of content 318 a second set of search results (e.g., preview search results). According to an embodiment, the Ajax receiver 336 obtains the search results by way of the search module 314. For example, the preview search results may include ASINs and images associated with items that match the refinement search. As represented at 348, the Ajax receiver 336 sends the preview search results to the script 330, which, as represented at 352 renders the preview search results in a preview window 360. According to an embodiment, if the preview search results include ASINs and images, then just the images are presented to the user via the preview window 360. According to some embodiments, the script 330 causes the preview window 360 to be rendered on top of the first set of search results of the search results presentation 322. For example, the preview window 360 may be a tooltip associated with the search refinement link 326 that the user moused over. It should be appreciated that the preview search results may include a subset of relevant search results and, when the user actually selects (i.e., clicks on) the corresponding search refinement link, a complete set of relevant search results are rendered in the search results presentation 322.

According to an embodiment, if the user clicks on one of the search results (e.g., images) provided in the preview window 360, the preview window 360 disappears and the webpage associated with the selected result replaces the search results presentation 322 that presented the first set of search results. Further, according to an embodiment, if the user does not click on one of the search results presented in the preview window 360 and instead moves the mouse pointer to another search refinement link 326, the script 330 causes the first preview window 360 to disappear and a second preview window pop up and render search results associated with the new search refinement link 326.

According to an embodiment, search results for all or some of the search refinement links 326 are pre-fetched when the search results presentation 322 is loaded. For example, the search results for the search refinement links 326 may be fetched before a user has a chance to mouse over the links. As such, the search results can be rendered in a preview window 360 immediately after the user mouses over the corresponding link. According to an embodiment, to pre-fetch search results, the script 330 is configured to pull search refinement information from some or all of the search refinement links 326 immediately after the search results presentation 322 is provided. The script 330 then sends the search refinement information to the Ajax receiver 336, which obtains preview search results and sends the obtained preview search results back to the script 330 so that the scrip 330 can render the preview search results immediately after a user mouses over or near one of the search refinement links 326.

According to an embodiment, the script 330 may be configured to pre-fetch preview search results for the search refinement links 326 most likely to be selected by the user. For example, since users may be likely to click on one or more of the first two to three search refinement links 326 presented on the search results presentation, the script 330 may be configured to pre-fetch preview search results for those links. In another example, after a user mouses over one of the search refinement links 326, the script 330 may pre-fetch preview search results for the adjacent search refinement links 326 because, after viewing the preview search results for the one search refinement link 326, the user is likely to mouse over adjacent search refinement links 326. In yet another example, the script 330 may be configured to pre-fetch preview search results for a particular search refinement link 326 when the user positions the mouse pointer within a threshold number of pixels of that link. In still another example, the script 330 may pre-fetch preview search results for all search refinement links 326 and concurrently render those preview search results in preview windows associated with each of the search refinement links 326. Thus, the user would not have to mouse over the search refinement links 326 to cause preview windows to render preview search results.

Figure 4:
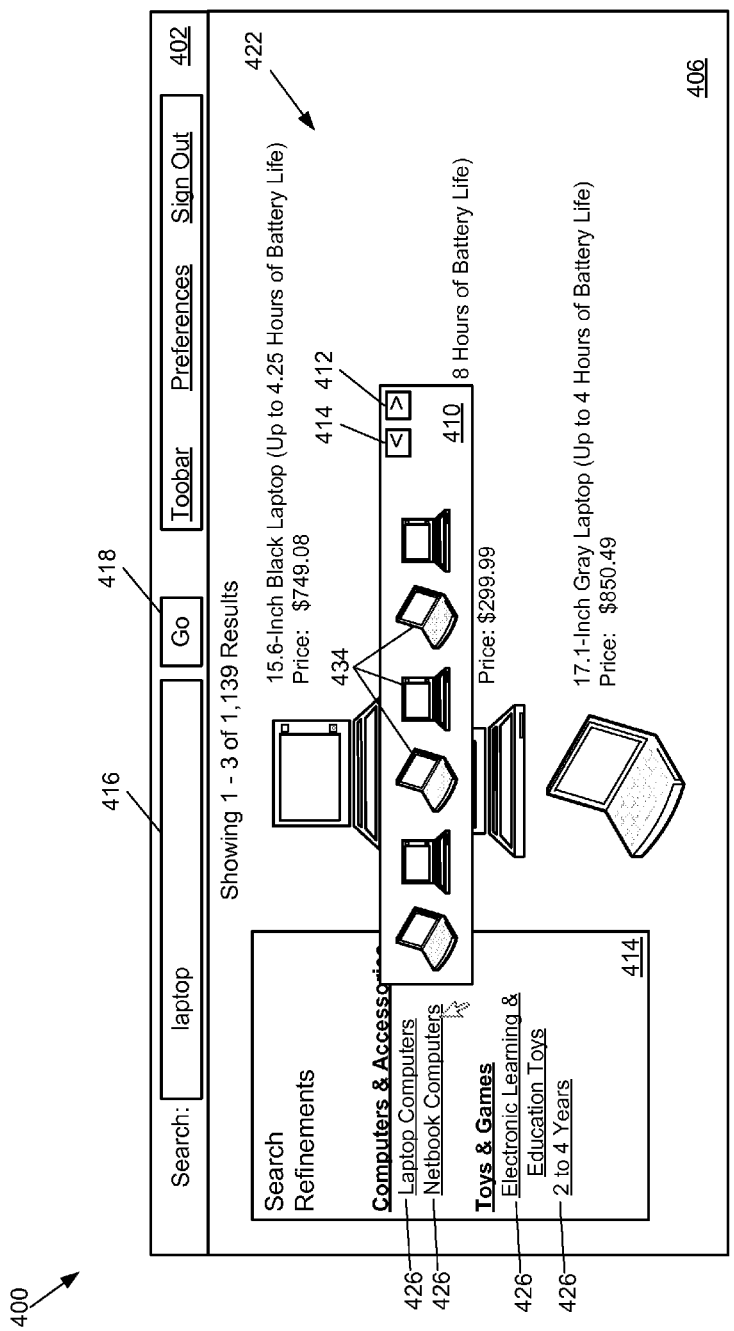
FIG. 4 is a schematic diagram depicting aspects of an example search user interface component in accordance with at least one embodiment.
Figure 5:
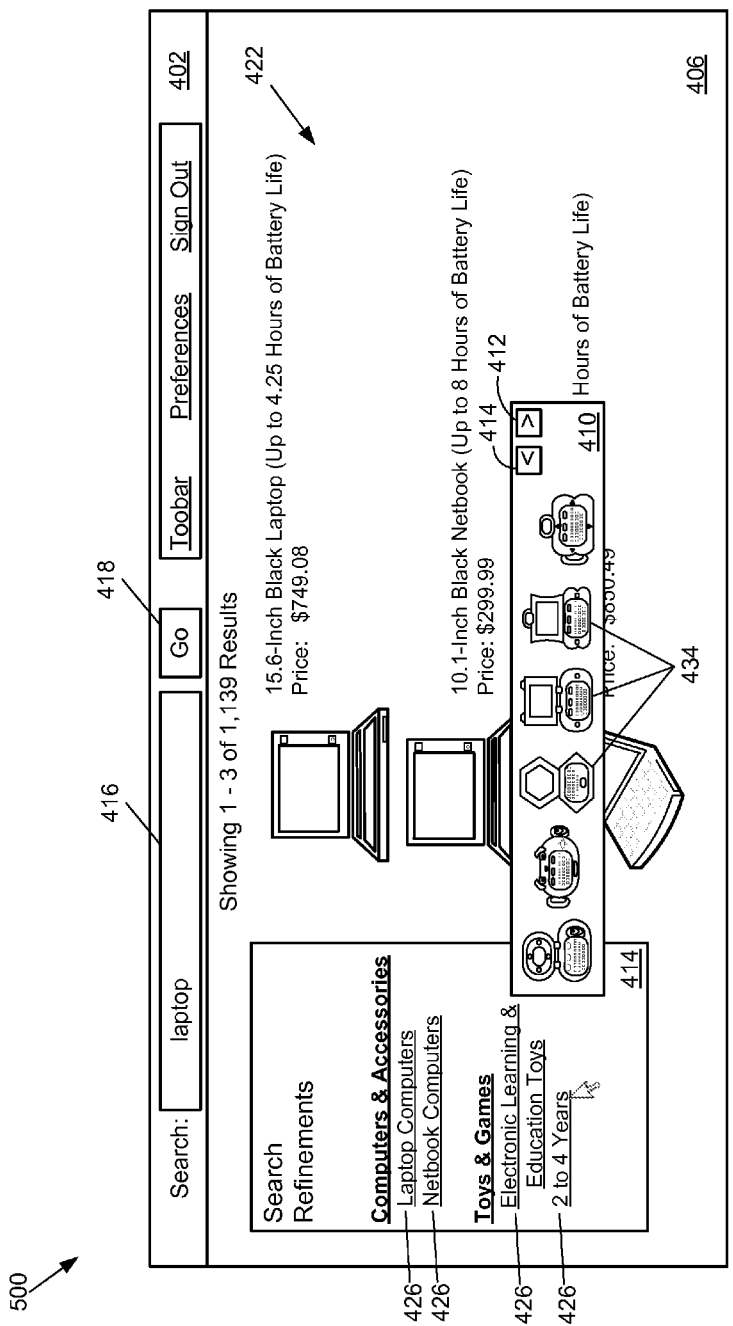
FIG. 5 is a schematic diagram depicting aspects of an example search user interface in accordance with at least one embodiment.

FIGS. 4 and 5 depict aspects of an example graphical user interface 400 in accordance with at least one embodiment. For example, the user interface 400 is an example of the search results presentation 322 shown in FIG. 3. The example user interface 400 includes a search input component 402, a search result component 406, and a search refinement component 414. A preview window 410 appears in the user interface 400 when a user hovers a mouse pointer over a link. The user interface 400 may incorporate other suitable user interface components as well.

The search input component 402 may include a free-text input component 416 and a search submission component 418. The user interface 400 shown in FIGS. 4 and 5 was generated in response to a keyword search of the term "laptop," which is shown in the free-text search box 416. The user interface 400 is for illustration purposes only, and is not meant to limit the scope of the technology described herein. Other user interfaces are within the scope of the technology described herein. The search result component 406, as shown in FIGS. 4 and 5, initially displays a subset of the search results. Using the example shown in FIG. 4, three items are initially displayed in the search result component. It is within the scope of the technology described herein to initially display any number of items.

The search refinement component 414 displayed in the user interface 400 includes multiple search refinement links 426. In this embodiment, the search refinement links 426 are examples of the search refinement links 326 shown in FIG. 3. These refinement links 426 are provided to assist the user to further refine their search. For example, user interface 400 indicates that over 1,000 search results were obtained based on a search for "laptop." By selecting the "Netbook Computers" link 426, the initial search for a "laptop" would further be refined to items contained in the laptop browse node as well as the netbook computers browse node. This technology is well known in the art and therefore does not require further description.

As illustrated, the preview window 410 may be positioned partially over the first set of search results provided in the search result presentation 422 and may include a set of images 434 that represent a portion of the content located behind one of the search refinement links 426. According to an embodiment, the preview window 410 appears when the mouse pointer is positioned over or near one of the search refinement links 426. However, if the mouse pointer is not positioned over or near one of the search refinement links 426, then the preview window 410 does not appear. Further, according to an embodiment, the preview window 410 includes scroll buttons 412, 414 that, when selected by the user, cause the search results (e.g., images 434) displayed in the preview window 410 to scroll across the preview window 410. For example, the search results scroll to the right when the user selects the right scroll button 412 and the search results scroll to the left when the user selects the left scroll button 414.

As mentioned above, according to an embodiment, the preview window 410 appears when one of the search refinement links 426 is moused over. In some embodiments, upon detecting a mouse-over event associated with the one of the search refinement links 426, the client 302 (FIG. 3) instructs the search service 304 (FIG. 3) to search for items contained in the browse node associated with the moused over link. The client 302 provides the preview window 410 for display and populates the preview window 410 with at least one image representing an item associated with the browse node. For example, with reference to FIG. 5, the user has positioned the mouse pointer over or near the "2 to 4 Years" refinement link 426, which represents the "2 to 4 Years" browse node contained within the "Toys & Games" browse node. Upon mousing over the link 426, the preview window 410 is populated with images of items available within the "laptop"/"Toys & Games"/"2 to 4 Years" browse node (e.g., laptop toys/games appropriate for 2-4 year old children).

FIG. 4 illustrates that a user can view items available in a different browse node simply by mousing over an different link. In particular, in FIG. 4, the user has moved the pointer from the "2 to 4 Years" search refinement link 426 to the "Netbook Computers" search refinement link 426 and the preview window 410 is populated with images 434 of items available within the "laptop"/"Computers & Accessories"/ "Netbook Computer" browse node.

Figure 6:
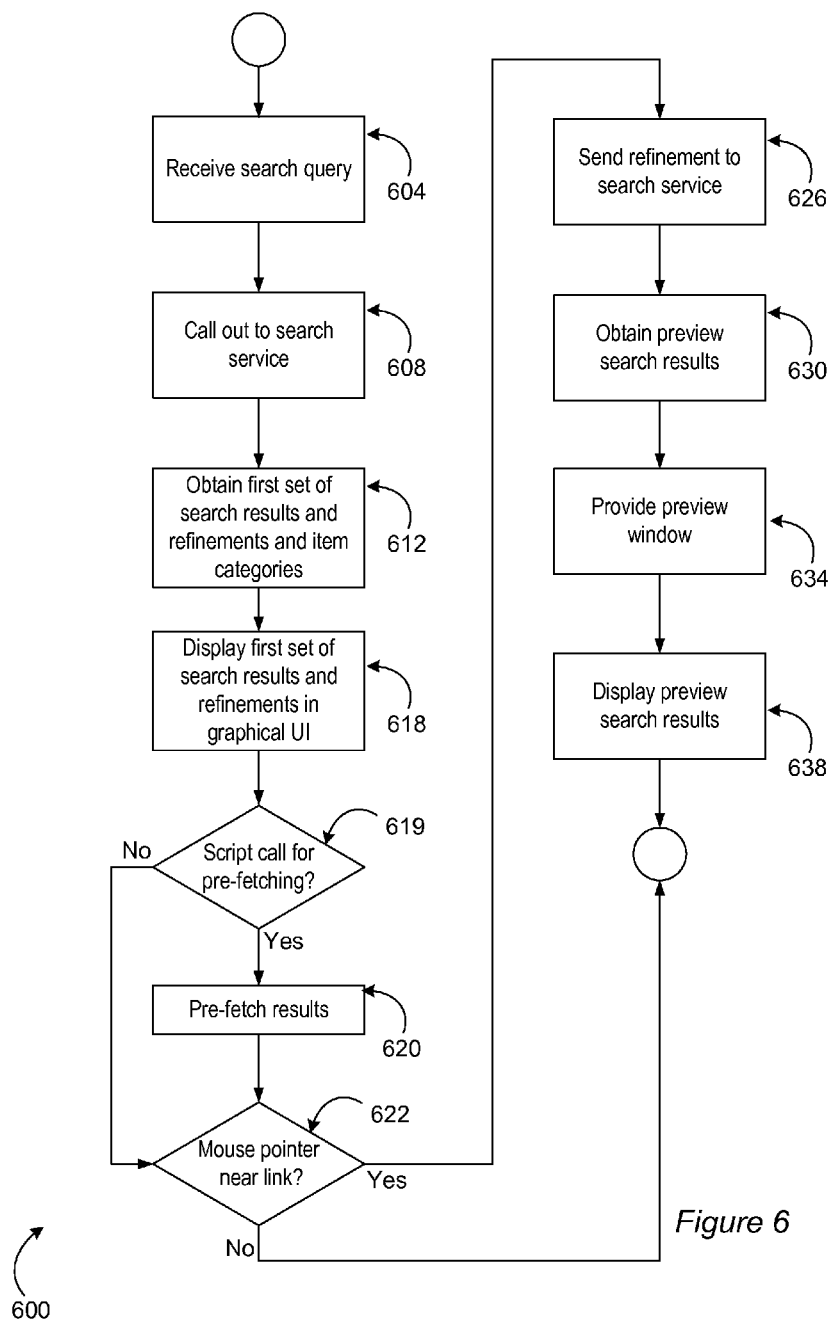
FIG. 6 is a flowchart depicting example steps for previewing content located behind links of search results webpages in accordance with at least one embodiment.

The description now turns to example steps that may be performed in accordance with at least one embodiment. For example, the example steps discussed below with reference to FIG. 6 may be executed by either of systems 200 or 300 shown in FIGS. 2 and 3. FIG. 6 depicts an example process 600 for previewing content located behind links of a search results webpage, in accordance with at least one embodiment. As indicated at block 604, the process 600 generally begins with receiving a search query. For example, a user may input search terms in the text input component 416 of the user interface 400. Next, as indicated at block 608, the process 600 involves calling out to a search service and then, as indicated at block 612, obtaining a first set of search results from the search service, where the first set of search results includes search refinement links. Then, as indicated at block 618, the process involves displaying the first set of search results in a graphical user interface. For example, to execute steps 608, 612, and 618, respectively, the search client 202 sends search terms 208 to the search module 210 of the search service 204, which responds with a first set of search results 212 that are presented in the search result presentation 422.

Next, as indicated at decision block 619, the process 600 involves determining whether a script running on the search results webpage specifies that search results located "behind" certain search refinement links should be pre-fetched. If so, the process 600 involves pre-fetching the search results for the links indicated by the script, as indicated at block 620. After pre-fetching, the process 600 continues to the step represented by decision block 622.

As indicated at decision block 622, in the event a user positions a mouse pointer over or near one of the search refinement links of the first set of search results, the process 600, as indicated at block 626, sends the corresponding refinement search to the search service to obtain search results associated with the link. After sending the refinement search to the search service, the process 600, as indicated at block 630, involves obtaining preview search results of the refinement search. Then, as indicated at block 634, the process 600 involves providing a preview window in the graphical user interface, where, according to some embodiments, the preview window is positioned on top of the first set of search results. Next, as indicated at block 638, the process 600 involves displaying the preview search results in the preview window.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
responsive to a first search query, providing for display, in a graphical user interface window, a first set of search results and search refinement links, each search refinement link corresponding to a different refinement query term;
pre-fetching a second set of search results for a subset of the search refinement links based on an ordering of the search refinement links in the graphical user interface window;
determining that a mouse pointer is positioned within a threshold number of pixels of a first search refinement link of the subset of the search refinement links;
providing for display the second set of search results associated with the first search refinement link, the second set of search results determined using a second search query associated with the first search refinement link;
determining that the mouse pointer is positioned within the threshold number of pixels of a second search refinement link of the search refinement links, the second search refinement link distinct from and adjacent to the first search refinement link;
calling a search service to pre-fetch a third set of search results upon determining that the mouse pointer is positioned within the threshold number of pixels of the second search refinement link of the search refinement links, the search service being requested to execute a third search query associated with the second search refinement link;
obtaining, from the search service, the third set of search results having one or more images of one or more items related to the third search query; and
providing for display, in a preview window positioned over a portion of the first set of search results, the one or more images of the one or more items of the third set of search results, the one or more images of the one or more items corresponding to the second search refinement link provided for display without receiving an indication of a selection of the second search refinement link.

2. The computer-implemented method of claim 1, wherein the preview window is a tooltip associated with the second search refinement link.

3. The computer-implemented method of claim 1, further comprising:
scrolling across the preview window the one or more images of the one or more items related to the second search refinement link.

4. The computer-implemented method of claim 1, further comprising:
responsive to receiving an indication of a selection of one of the one or more images provided for display in the preview window, displaying in the graphical user interface window information related to the item that corresponds to the selected one of the one or more images.

5. A computer-implemented method, comprising:
providing for display a first set of search results, each search result of the first set of search results corresponding to a user-selectable element;
pre-fetching a second set of search results for a subset of user-selectable elements based on an ordering of the user-selectable elements in a graphical user interface window, each user-selectable element from the subset of user-selectable elements corresponding to a different refinement query term;
detecting that a mouse pointer is positioned within a threshold number of pixels of a first user-selectable element from the subset of user-selectable elements;
providing for display, in a preview window positioned over a portion of the first set of search results, the second set of search results associated with the first user-selectable element;
determining that the mouse pointer is positioned within the threshold number of pixels of a second user-selectable element distinct from and adjacent to the first user-selectable element;
pre-fetching a third set of search results upon determining that the mouse pointer is positioned within the threshold number of pixels of the second user-selectable element, the third set of search results based at least in part upon the second user-selectable element; and
providing for display, in the preview window, one or more search results of the third set of search results.

6. The computer-implemented method of claim 5, wherein the preview window is a tooltip associated with the second user-selectable element.

7. The computer-implemented method of claim 5, wherein the user action includes the mouse pointer being positioned over the second user-selectable element.

8. The computer-implemented method of claim 5, wherein the second user-selectable element is a search refinement link that, upon activation, instructs a search service to refine search results of the search results webpage.

9. The computer-implemented method of claim 5, wherein the third set of search results, displayed in the preview window, includes one or more images of one or more items related to the second user-selectable element.

10. The computer-implemented method of claim 9, further comprising:
responsive to a user selecting one of the one or more images provided for display in the preview window, displaying in the graphical user interface window information related to the item that corresponds to the selected one of the one or more images.

11. The computer-implemented method of claim 9, further comprising:
scrolling across the preview window the one or more images of the one or more items related to the second user-selectable element.

12. The computer-implemented method of claim 11, wherein a user controls, via a peripheral device, the scrolling of the one or more images.

13. A computer-implemented method, comprising:
responsive to a first search query, providing for display, in a graphical user interface window, a first set of search results comprising user-selectable elements that cause execution of a second search, each user-selectable element corresponding to a different refinement query term;
pre-fetching a second set of search results for a subset of user-selectable elements based on an ordering of the user-selectable elements in the graphical user interface window for the subset user-selectable elements;
detecting a mouse pointer is positioned within a threshold number of pixels of a first user-selectable element from the subset of user-selectable elements;

providing for display, in a preview window positioned over a portion of the first set of search results, the second set of search results associated with the first user-selectable element;

determining that the mouse pointer is positioned within the threshold number of pixels of a second user-selectable element distinct from and adjacent to the first user-selectable element;

pre-fetching a third set of search results upon determining that the mouse pointer is positioned within the threshold number of pixels of the second user-selectable element, the third set of search results based at least in part upon the second user-selectable element, the second set of search results including one or more images of one or more items related to the second user-selectable element; and providing for display, in the preview window, one or more search results of the third set of search results, wherein a user is able to view the one or more search results of the third set of search results irrespective of selecting the first user-selectable element or the second user-selectable element.

14. The computer-implemented method of claim 13, wherein the preview window is a tooltip associated with the second user-selectable element.

15. The computer-implemented method of claim 13, wherein the user action includes the mouse pointer being positioned over the second user-selectable element.

16. The computer-implemented method of claim 13, further comprising:

responsive to the user selecting one of the one or more images provided for display in the preview window, displaying in the graphical user interface window information related to the item that corresponds to the selected one of the one or more images.

17. The computer-implemented method of claim 13, further comprising:

upon providing for display, in the graphical user interface window, the first set of search results, the second set of search results being pre-fetched to display the second set of search results in a second preview window immediately upon determining that the mouse pointer is positioned within the threshold number of pixels of the first user-selectable element.

18. The computer-implemented method of claim 13, wherein the second set of search results comprises one or more of the user-selectable elements that the user is most likely to select.

19. The computer-implemented method of claim 13, wherein the pre-fetched third set of search results is limited to a number of relevant search results and, if the user actually selects the corresponding one of the user-selectable elements, a complete set of search results is obtained from a search service and presented in the graphical user interface window.

20. A non-transitory computer-readable storage medium including instructions that, when executed by a processor, cause the processor to:

provide for display a first set of search results, each search result of the set of search results corresponding to a user-selectable element;

pre-fetch a second set of search results for a subset of user-selectable elements based on an ordering of the user-selectable elements in a graphical user interface window, each user-selectable element from the subset of user-selectable elements corresponding to a different refinement query term;

detect that a mouse pointer is positioned within a threshold number of pixels of a first user-selectable element from the subset of user-selectable elements;

provide for display, in a preview window positioned over a portion of the first set of search results, the second set of search results associated with the first user-selectable element;

determine that the mouse pointer is positioned within the threshold number of pixels of a second user-selectable element distinct from and adjacent to the first user-selectable element;

pre-fetch a third set of search results upon determining that the mouse pointer is positioned within the threshold number of pixels of the second user-selectable element, the third set of search results based at least in part upon the second user-selectable element; and provide the preview window for displaying one or more search results of the third set of search results.

21. The computer-readable storage medium of claim 20, wherein the preview window is a tooltip associated with the at least one of the user-selectable elements.

22. The computer-readable storage medium of claim 20, wherein the user action includes the mouse pointer being positioned over the at least one of the user-selectable elements.

23. A system, comprising:

a processor; and a memory device including instructions that, when executed by the processor, cause the processor to:

provide for display a first set of search results, each search result of the first set of search results corresponding to a user-selectable element;

pre-fetch a second set of search results for a subset of user-selectable elements based on an ordering of the user-selectable elements in a graphical user interface window, each user-selectable element from the subset of user-selectable elements corresponding to a different refinement query term;

detect that a mouse pointer is positioned within a threshold number of pixels of a first user-selectable element from the subset of user-selectable elements;

provide for display, in a preview window positioned over a portion of the first set of search results, the second set of search results associated with the first user-selectable element;

determine that the mouse pointer is positioned within the threshold number of pixels of a second user-selectable element distinct from and adjacent to the first user-selectable element;

pre-fetch a third set of search results upon determining that the mouse pointer is positioned within the threshold number of pixels of the second user-selectable element, the third set of search results based at least in part upon the second user-selectable element; and provide the preview window for displaying one or more search results of the third set of search results.

24. The system of claim 23, wherein the preview window is a tooltip associated with the at least one of the user-selectable elements.

* * * * *